United States Patent [19]

Somer

[11] Patent Number: 4,682,344
[45] Date of Patent: Jul. 21, 1987

[54] RF FSK TRANSMITTER

[75] Inventor: Gerald L. Somer, Sebastopol, Calif.

[73] Assignee: AMP Incorporated, Harrisburg, Pa.

[21] Appl. No.: 760,686

[22] Filed: Jul. 30, 1985

[51] Int. Cl.$^4$ .......................... H04L 27/12; H03C 3/00
[52] U.S. Cl. ........................................ 375/62; 375/45;
  331/179; 332/16 R
[58] Field of Search ............................ 331/117 R, 179;
  330/278, 282; 375/45, 51, 62, 65; 332/16 R, 18

[56] References Cited

U.S. PATENT DOCUMENTS

| | | | |
|---|---|---|---|
| 3,061,799 | 10/1962 | Biard ...................................... | 332/14 |
| 3,076,152 | 1/1963 | Biard et al. .......................... | 331/113 |
| 3,386,051 | 5/1968 | Widl .................................... | 331/117 |
| 3,506,784 | 4/1970 | Garland ............................... | 178/66 |
| 3,618,132 | 11/1971 | Hingston .............................. | 331/179 |
| 3,701,053 | 10/1972 | de Rubinat .......................... | 332/9 T |
| 3,719,779 | 3/1973 | Wilson ............................... | 178/66 R |
| 3,803,354 | 4/1974 | Bennett ............................... | 178/66 R |
| 3,875,526 | 4/1975 | Beeman et al. ...................... | 331/179 |
| 3,889,210 | 6/1975 | Matsuura et al. .................... | 331/179 |
| 4,066,981 | 1/1978 | Levine ................................. | 331/179 |
| 4,091,342 | 5/1978 | Whitten .............................. | 332/29 R |
| 4,311,971 | 1/1982 | LaRosa ............................... | 332/9 R |
| 4,354,163 | 10/1982 | Kato .................................... | 330/311 |
| 4,368,439 | 1/1983 | Shibuya et al. ...................... | 332/9 R |

Primary Examiner—Robert L. Griffin
Assistant Examiner—Andrew J. Telesz, Jr.
Attorney, Agent, or Firm—David L. Smith

[57] ABSTRACT

An improved transmitter circuit for rf modems usable for communication in local area computer networks is provided. The transmitter circuit includes a digital-/analog conversion circuit for generating a frequency modulated carrier from an input data signal, and a switched linear amplifier for amplifying and controlling the frequency modulated analog signal under the direction of the LAN protocol. The conversion circuit includes a time balanced compensated switching circuit for maintaining duty cycle integrity, while the switched linear amplifier provides on/off carrier control and level adjustment with minimum signal distortion including switching transients, and with minimum spurious signal leakage when off.

14 Claims, 7 Drawing Figures

RF FSK TRANSMITTER

FIELD OF THE INVENTION

This invention relates to a radio frequency transmitter and, more particularly, to a broadband Local Area Network modem transmitter for converting NRZI coded digital input data into a frequency shift keyed radio frequency output for use with commercial cable-based broadband Local Area Networks.

BACKGROUND OF THE INVENTION

Local Area Networks (LAN) provide means for interconnecting computers and workstations to permit or facilitate the exchange of data or use of common data and/or program sources. Although several competing commercial schemes have been developed, each generally comprises control software and logic hardware for protocol implementation, transmit/receive hardware for interfacing the logic hardware to the transmission network itself, and a transmission medium network. The present invention relates specifically to the transmit portion of the transmit/receive hardware interface or modem.

Although the transmit/receive hardware or modem is generally independent of the logic hardware, it is necessary for the modem to provide functions required for implementation of the selected LAN protocol. These functions are best understood with reference to a particular representative commercial LAN system.

One such system, for example, the IBM ® PC NETWORK (trademark of IBM Corporation), utilizes a CSMA/CD (Collision Sensing Multiple Access/Collision Detecting) protocol for transmitting NRZI coded digital data at two megabits per second (Mbps) by means of a two megahertz (MHz) frequency shift keyed signal centered on a radio frequency (rf) carrier at 50.7 MHz. A complete modem must further provide a receiver for receiving a signal transmitted at the center frequency of 219.0 MHz, although the receiver forms no part of the present invention.

A typical LAN may include up to 1,000 individual workstations connected by broadband coaxial cable and multi-port hubs to a head end controller. Because only one workstation may transmit to the controller at a given time, each monitors the network according to the protocol and initiates communication only upon completion of any existing communication. If two or more stations attempt to capture the network simultaneously, the controller determines that a "collision" has occurred which is resolved according to the LAN protocol.

Collisions are detected when the received bit pattern is garbled, indicating overlap of simultaneous signals. It is necessary, therefore, that the transmission power of individual workstation transmitters be closely matched to prevent a stronger signal from dominating and masking the existence of a weaker simultaneous signal. Thus the transmitter circuits of the individual workstation modems be carefully controlled so that received information will fall within the window defined for valid communication, which for a typical is approximately 6 dB.

Numerous simultaneous restraints and conditions are therefore placed on the operation of the transmitter circuit of an rf modem for use in such a network. For example, the transmitter amplifier must provide for initiating and terminating transmission of the analog carrier under control of the control logic and protocol. The turn-on and turn-off times must be faster than a few microseconds, but must permit completion of any transmission without truncation when signaled to turn off.

Further, distortion and noise must be minimized. The signal received at the head end of the network will in general comprise accumulated signal leakage from all connected transmitters in their "off" state as well as the desired transmission from the single "on" transmitter. This desired signal is itself comprised not only of desired intellegence but also various forms of distortion which consume a portion of the available signal. The transmission power of the transmitter therefore must provide sufficient headroom for the worst case distortion and spurious signal conditions to prevent the received signal from exceeding the prescribed window and triggering a false collision response. Prior art systems have met these limitations by restricting the transmission power of the transmitter and allocating up to 4 dB as overhead for noise and spurious signals. This limitation, however, restricts the power of the desired carrier and limits the length of connecting cable that may be used.

To minimize this restricting overhead, the switched amplifier must limit amplitude overshoot when the carrier is turned on. Similarly, the transmission amplifier must provide the necessary switching and level adjustment features without significant distortion of the desired signal. When the carrier is turned off, residual signal leakage must be very small to avoid interference with other signals, preferably −80 dB or more relative to when the signal is on.

In general, the output amplitude of the transmitter circuit must be accurately set and stable over a range of temperatures and the life of the design. When the signal source is frequently modulated, the amplitude of the carrier at each of the transmitting frequencies should preferably be equal and similarly unaffected by temperature, to minimize residual AM distortion.

Further, accuracy of the relative duration of one and zero pulses must be high, within five percent of equal, to minimize distortion related to bit error rates and carrier/noise ratio and to assure that the signal occupies as much of the allocated time slot as possible.

It is therefore an object of the present invention to provide an improved rf modem transmitter which increases the signal-to-noise ratio and provides greater transmission accuracy. Another object is to provide such a transmitter which reduces noise overhead and permits higher transmitter output power within given LAN restrictions, thereby increasing transmission reliability and permitting use of longer connecting cables.

A specific object is to provide a transmitter having a stable switched capacitor oscillator, wherein switching delays are balanced to maintain the duty cycle of the frequency modulated output equal to that of the data input signal.

A further object is to provide a switched linear amplifier which minimizes spurious output when off, and permits adjustment of signal gain without affecting stability or performance of the amplifier.

BRIEF SUMMARY OF THE INVENTION

In order to achieve the objects of the invention and to overcome the problems previously discussed, an rf modem transmitter is provided which includes, in conjunction with a digital to analog converter comprising a master oscillator, switchable means for altering the frequency of the master oscillator between a first and a second output frequency, and means for selectively switching the frequency altering means to selectively achieve the first and second output frequencies, a means for balancing the switching times of the switching means to maintain the integrity of the duty cycle of an applied data signal irrespective of inherent unequal switching times for the switching means utilized. For example, where the switching means includes an electronic switch which exhibits unequal "on" and "off" transition times, a delay means is provided to delay the more rapid state transition to provide equalization. Similar delay of the slower state transition may also be provided. Where the electronic switch comprises a transistor, the delay means may include a second and preferably matched transistor in an inverting configuration such that both state transitions are balanced.

Quality factor compensating means may further be provided to substantially equalize the quality factor of the frequency determining network of the master oscillator, thereby minimizing output distortion. Specialized fast acting bias may also be provided for the electronic switching means to enhance stability of the oscillator.

The rf modem transmitter may further provide means for switching the output amplifier on and off in response to a control signal, which means preferably also shunts the input analog signal to ground to minimize spurious output when the transmitter amplifier is off. Specialized level adjustment means are provided for adjusting the AC gain without negatively affecting DC gain or bias conditions of the amplifier which could cause distortion.

DETAILED DESCRIPTION OF PREFERRED EMBODIMENTS

The remaining portion of this specification will describe preferred embodiments of the invention when read in conjunction with the attached drawings, in which like reference characters identify identical apparatus.

Figure 1:
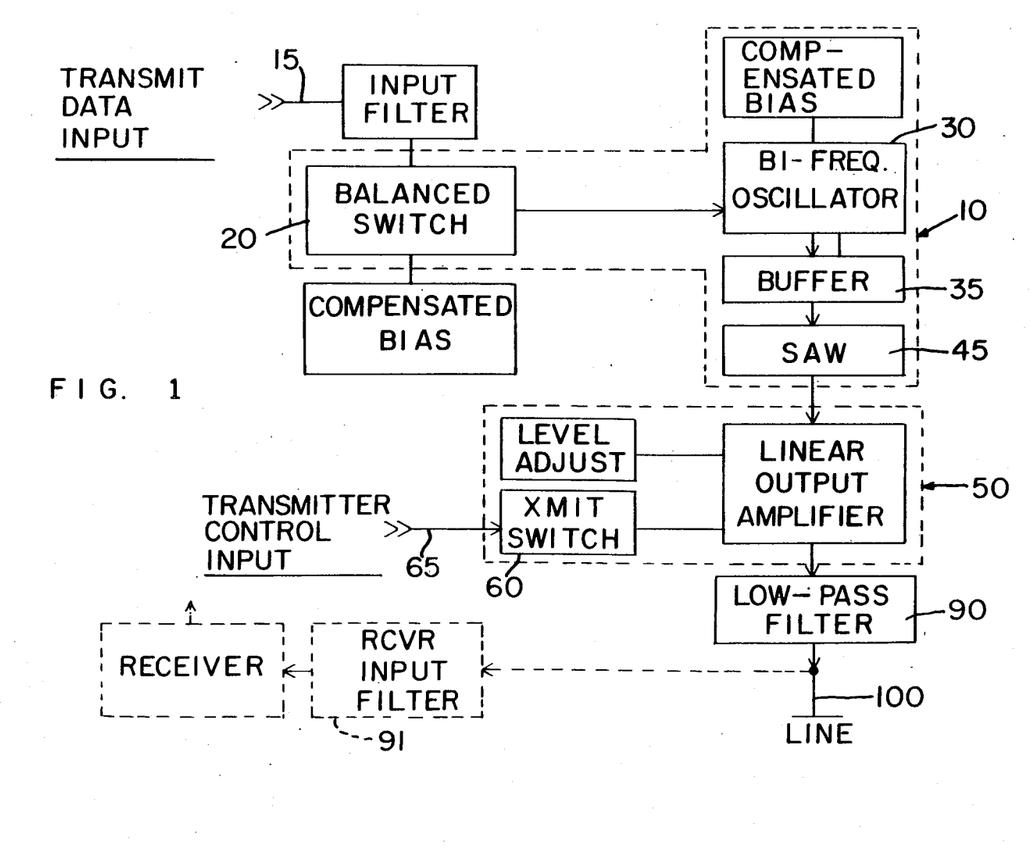
FIG. 1 is a block diagram illustrating the basic elements and operation of the present invention.

FIG. 1 is a block diagram illustrating the basic components of a preferred embodiment of the present invention for use in conjunction with, for example, the IBM ® PC NETWORK. Although the embodiments described are optimized for use in conjunction with the IBM PC NETWORK, it is understood that the present invention is not limited to use with any particular LAN or protocol.

Digital/analog converter means 10 converts the input data 15, which may be NRZI encoded TTL level data with a 50% duty cycle, to a frequency shift keyed (FSK) analog output signal. A bi-frequency oscillator 30 is provided, comprising a high stability master oscillator with termperature compensation and means for altering the frequency of the master oscillator, which in the preferred embodiment comprises a switched capacitor in the freqency determining network of the oscillator.

Time balanced switching means 20 is provided which switches the switched capacitor between an active and a floating state, thereby modulating the frequency of the oscillator output in response to the input data 15. Means are provided for time balancing switching means 20 to maintain the duty cycle of the input data without significant distortion of the respective "on" and "off" times due to inherent differences in switching speeds of the switching means employed. A specialized fast recovery bias means further minimizes signal distortions.

A buffer 35 isolates the oscillator from later stages to enhance its stability. The signal is then filtered by surface acoustic wave filter 45 which band limits the signal before final amplification for transmission.

Switched output amplifier 50 amplifies the analog signal to the desired level for transmission. AC gain or level adjustment is provided so that the signal output may be optimized with respect to the LAN protocol and transmission medium.

A transmitter switching and signal shunting means 60 is also provided to permit necessary switching of the output carrier in response to a transmitter control signal 65 generated by the LAN protocol and logic hardware. The transmitter switching means 60 is designed to minimize spurious leakage of the carrier to the transmission medium when the switched amplifier 50 is "off".

Finally, the switched output is coupled to the transmission medium by low pass transmitter output filter 90, which isolates the transmitter circuit from alternate channel transmission frequencies which may be simultaneously present on the network.

A complete rf modem further includes a receiver for receiving signals at alternate carrier frequencies from the network and converting them to data for the individual work station. The receiver is coupled to the transmitter circuit by means of an input filter 91 which isolates the receiver from the transmitted carrier.

Figure 2:
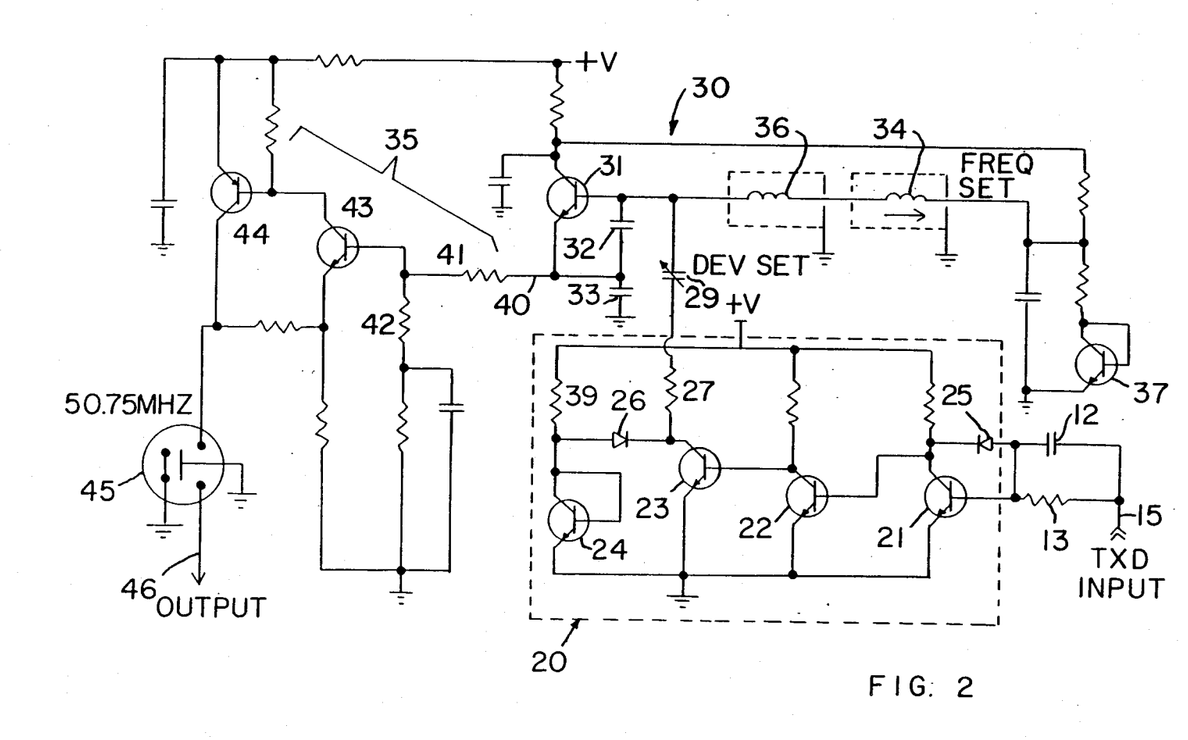
FIG. 2 is a circuit diagram illustrating a preferred embodiment of the digital/analog converter portion of the present invention, including a master oscillator, time balanced switching means, buffer amplifier, and bandlimiting filter.

A preferred embodiment of the bi-frequency oscillator 30 is shown in FIG. 2. The master oscillator comprising oscillator transistor 31, capacitors 32, 33, and inductors 34, 36, is an LC oscillator with capacitive voltage divider (CLAPP). Also included in the frequency determining tuned circuit is difference capacitor 29 which is switched between a first active or connected state, and a second floating state by time balanced switching means 20, as discussed more fully below.

The master oscillator is optimized to enhance stability of both the output frequency determined by the timing components, and the amplitude of the output analog signal. Transistor 37 is used as a bias diode to stabilize oscillator transistor 31 with temperature. In the preferred embodiment, transistors 31 and 37 are elements of a multiple transistor monolithic transistor array, preferably RCA CA3083. The transistors are therefore closely matched and share a common substrate such that each is subjected to a nearly identical thermal environment.

In addition, capacitors 32, 33 and inductors 34, 16 are selected in a preferred embodiment to provide additional thermal stability. Specifically, capacitor 32 preferably has a negative temperature coefficient of 220 parts per million per degree Centigrade (N220), while capacitor 33 preferably has a stable temperature coefficient (NPO). Inductor 36 is a highly stable air core inductor, which provides the majority of needed inductance. Less stable adjustable ferrite core inductor 34 is provided for tuning purposes, and comprises approximately 10% of the total desired inductance.

To permit the output of the master oscillator to be keyed in response to the input data, a switchable means for altering the frequency of the master oscillator, and a means for switching the frequency altering means, are provided. In the preferred embodiment, frequency altering means comprises difference capacitor 29, and the switching means comprises switching transistor 23. When transistor 23 is "on", it presents a low impedance path to ground for difference capacitor 29 through series resistor 27. Thus, capacitor 29 is effectively coupled to the timing circuit of the master oscillator, resulting in a first output at 49.75 MHz. In contrast, when transistor 23 is "off" the low impedance path is removed and capacitor 29 is effectively floating with respect to the master oscillator, resulting in a second output at 51.75 MHz.

A means is provided for balancing the quality factor (Q) of the master oscillator tuned circuit so that the Q remains approximately the same whether capacitor 29 is active or is floating. In the preferred embodiment, this comprises series resistor 27, which in a preferred embodiment has a value of approximately 4.7 ohms. This balancing minimizes residual amplitude modulation by compensating the quality factor at the differing transmission frequencies.

In order to provide the desired low impedance path for capacitor 29, it is necessary for switching transistor 23 to be driven into the saturation region when "on." Although the turn-on time for the bipolar transistor is fast, stored charge accumulated while saturated must be dissipated before the transistor can be turned off, resulting in a significantly longer turn-off time on the order of 0.6 microseconds. This difference between turn-on and turn-off times is significant with respect to rf switching required for an applied data rate of 2 Mbps, and would result in distortion of the desired 50% duty cycle. Such distortion is important not only because of its distortion of the duty cycle or waveform of the output, but also because the frequency of the oscillator at data rates is in part dependent upon the duty cycle of the waveform.

In order to overcome these problems, time compensating means are provided. In the preferred embodiment, for example, transistor 22 is included as a delay means for driving switching transistor 23. Transistors 22 and 23 are preferably elements of the monolithic transistor array previously discussed, and therefore are closely matched and subject to nearly identical thermal conditions. Thus, transistor 22 will store an identical charge as transistor 23 when saturated, and exhibit turn-on and turn-off times substantially identical to those of transistor 23. Switching transistor 23 will consequently turn on only when time compensating transistor 22 turns off, thereby delaying the otherwise rapid turn-on of switching transistor 23 a period of time equal to the turn-off time of transistor 22. Similarly, transistor 23 will turn "off" only after transistor 22 has turned "on." By balancing the "on" and the "off" transitions in this manner by delaying each an amount equal to its converse, the switched output is balanced and maintained at the desired 50% duty cycle of the input.

Transistor 21 is provided to assure that the operation of the charge storage transistors 23, 22 is independent of the voltage of input signal 15. Hot carrier diode 25 is provided in the collector-to-base feedback path of buffer transistor 21 to prevent charge storage. Capacitor 12 and resistor 13 provide initial input filtering of the data signal 15 applied to buffer transistor 21.

For transistor 23 to perform well as an rf switch it must as discussed be saturated when "on," have sufficient DC collector bias to not conduct during any portion of any FR cycle when "off," and transition between these states as quickly as possible. Use of a normal pull-up bias resistor for switch 23 would negatively effect operation of the switching circuit and the resulting switched oscillator, however. For example, use of a low valued pull-up bias resistor, while meeting the requirement of charging the difference capacitor 29 and other parasitic capacitances rapidly as transistor 23 turns off, would also load the oscillator and severely degrade its quality factor (Q) while transistor 23 is "off." It would have no effect while transistor 23 is "on," thereby resulting in severe output distortion.

In contrast, use of a high value for a pull-up bias resistor would have much less effect on the quality factor (Q) but would not provide quick bias recovery as transistor 23 turns off. Finally, other standard solutions, such as use of a choke coil or a parallel resonant tank circuit in place of a pull-up bias resistor, would introduce large switching transients resulting from switching current through the inductor, thereby introducing severe distortion.

Thus, a specialized fast-recovery bias means is provided for the switching means. In the preferred embodiment, hot carrier diode 26, transistor 24, and resistor 39 quickly supply the required DC bias as switching transistor 23 turns off. Resistor 39, which is low valued and preferably one thousand ohms, provides quick charging of all circuit capacitances including difference capacitor 29 as transistor 23 turns off. The voltage on the collector of transistor 23 will quickly rise to a value which will leave hot carrier diode 26 biased off except for very small periods of time at the negative peaks of the rf signal swing. After the bias has reached steady state, diode 26 needs only to conduct long enough to replace any charge lost due to leakage in diode 26 and transistor 23. However, this leakage is on the order of nanoamps, and for practical purposes diode 26 remains nonconducting after reaching steady state. This effectively removes resistor 39 from the circuit. Thus, the low-valued resistor 39 provides the benefits of a low resistance bias pull-up without degrading the quality factor of the circuit while transistor 23 is "off." Of course, resistor 39 does not effect a quality factor when transistor 23 is on, for it is effectively shunted to ground.

Diode 26 is preferably a hot carrier diode because its inherent fast recovery permits implementation of the most efficient detector. It should be noted, however, that silicon or germaniun diodes may be substituted, although performance would be lessened. The DC offset and hence the undesirable lower bias which results from the forward voltage drop of diode 26 is more than compensated for by the diode connected transistor 24. Such additional offset is desirable for it insures that the collector-to-base junction of transistor 23 will not conduct at the negative peaks of the rf signal swing. If such conduction were allowed, it would provide a source of leakage which would have to compensated for by diode 26 with corresponding degradation in the quality factor of the circuit when transistor 23 should be "off."

Bias transistor 24 is preferably an element of the monolithic transistor array including transistor 23 and therefore provides temperature compensation as well. Although transistor 24 could be replaced by another form of diode or by a short without destroying operation of the overall switching circuit, performance would be degraded. Similarly, a resistor could alternatively be utilized although its performance would not be optimum due to its higher AC resistance which would require an additional bypass capacitor.

As further illustrated in FIG. 2, a buffer is provided to isolate the oscillator circuit from the transmitter circuit and the surface acoustic wave filter 45, whose impedance can vary with frequency and negatively affect stability of the oscillator. In the preferred embodiment, the frequency modulated output 40 of the oscillator is applied to a resistor attenuator comprising resistors 41, 42 which provides some signal isolation. The output of the attenuator is then applied to a buffer amplifier comprising transistors 43 and 44. Transistors 43 and 44 further provide a low impedance voltage source for the SAW filter.

The buffered output is then applied to a surface acoustic wave filter 45. Although the trade-off between insertion loss and delay distortion determined by impedance conditions at each end of such a filter require the linear output amplifier to provide additional gain to offset filter transmission loss resulting from optimization of the delay distortion, such filters provide the necessary limitation of occupied bandwidth in a small package that requires no tuning adjustments. However, it should be understood that other forms of filtering could similarly be utilized without departing from the scope of the present invention. In the preferred embodiment illustrated, the SAW filter is a Kyocera KAF50.75MRMA-1.

Figures 3, 4:
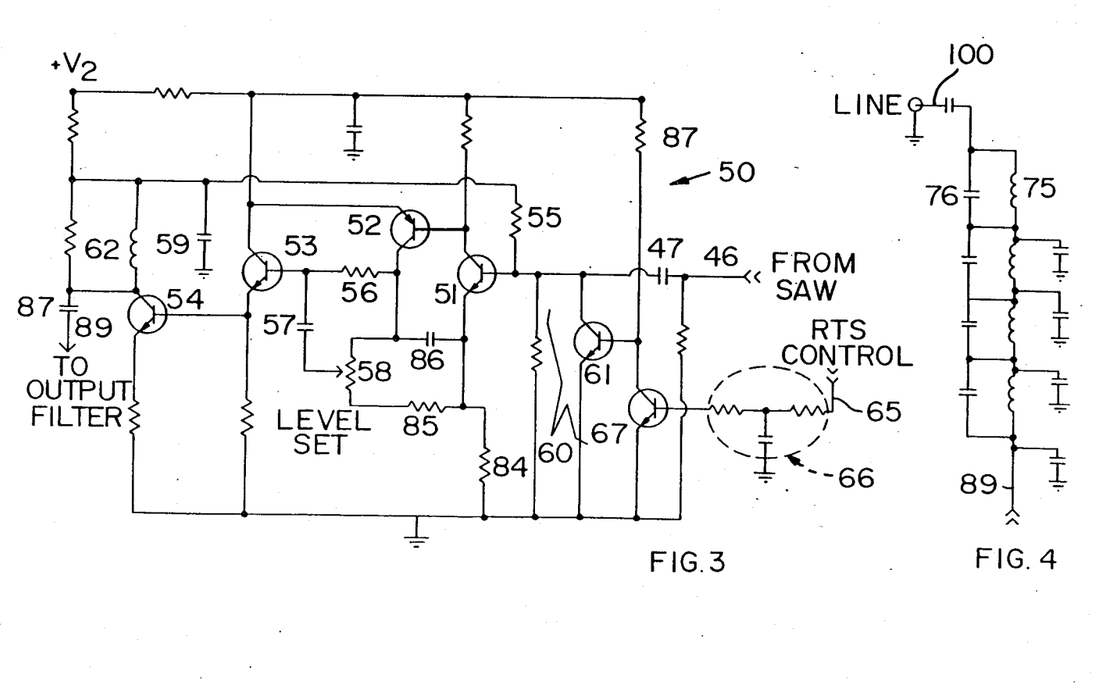
FIG. 3 is a circuit diagram illustrating a preferred embodiment of the switched linear output amplifier of the present invention, including switching and signal shunting means, and means for adjusting the AC gain.
FIG. 4 is a circuit diagram illustrating a preferred embodiment of the transmitter output filter.

The bandlimited output 46 is then applied to the switched output amplifier 50, shown in FIG. 3. In addition to providing an adjustable linear increase in the level of bandlimited frequency modulated signal 46 as required for transmission over the LAN network, the amplifier 50 must rapidly switch the carrier on and off under control of the LAN protocol, and must limit spurious leakage in the off state to a very low level. Thus the output amplifier so includes a linear rf amplifier, means for adjusting the AC gain of the amplifier, and means for switching the amplifier and output carrier on and off.

In the preferred embodiment, transistors 51, 52 and 53, and feedback resistor 55, comprise a negative feedback linear amplifier with DC coupling. The DC coupling permits the amplifier to be switched on and off without transient effects from stored charge in the coupling capacitors. Although the adjustable voltage gain is approximately unity, significant power gain is achieved because the output impedance is much lower than the input impedance. The linear amplifier is frequency compensated in a manner known in the art by capacitor 86 for wideband operation. Output driver 54 in the preferred embodiment is a frequency compensated 2N3866 bipolar transistor in a configuration known in the art.

The switching means of the preferred embodiment further provides a means for shunting the input signal. Specifically, electronic switching means, transistor 61, provides a very low impedance rf path to ground for the input signal 46 when transistor 61 goes into saturation. Thus the input signal is effectively shunted, reducing spurious signal emission. Saturation of switching means 61 also removes bias from the linear amplifier transistors and turns them off, thereby minimizing power consumption with resultant heat generation and further minimizing the potential for spurious signal generation and leakage to the network.

Because of the time delay introduced by the SAW filter discussed in connection with FIG. 2, it is desirable to provide a means for delaying turn-off of the output stage until completion of the transmission through the output filter 90. In the preferred embodiment, delay network 66 is provided in conjunction with transistor 67 to give a three microsecond offset to both the turn-on and turn-off times of transistor 61 in response to the transmitter control signal 65, and to buffer switching means 61 from possible variations in control signal 65.

To permit the linear amplifier to be adjusted for providing the optimum gain within network transmission constraints, an AC gain or level adjustment means is also provided. The DC gain of the amplifier comprising transistors 51 and 52 is approximated by the ratio of the series combination of the total resistance of resistor 58 and resistor 85 and 84 divided by the value of resistor 84. It is desirable not to effect this DC forward gain when the AC level is adjusted, to permit bias stability and minimize output variances and potential distortion such as clipping. It is also desirable not to affect the wideband response of the amplifier.

Accordingly, the slider of variable resistor 58 is AC coupled to the base of transistor 53 by means of capacitor 57. Because resistor 56 has a significantly larger value than resistor 58 (1,000 ohms vs. 200 ohms in the preferred embodiment), the AC path through resistor 56 is not large with respect to the lower impedance path provided by the selected portion of resistor 58 and capacitor 57. Thus the preferred path for AC includes the selectable portion of variable resistor 58, while the preferred DC path remains resistor 56. The AC gain may therefore be adjusted by moving the slider of resistor 58 without affecting the forward DC gain of the amplifier.

Because of the DC coupling and use of significant negative feedback for stability, the resulting amplifier attempts to resist any instantaneous change in state such as at the desired turn-off and turn-on. These effects are particularly problemsome during initial turn on, since the feedback is active during the transition. Undesirable signal transients and ringing may therefore result. Capacitors 87, 59 and 47 and 57 minimize these transition effects and have values, in the preferred embodiment, of 150 PF, 470 PF, and 470 PF, and 1000 PF respectively.

Figure 5A:
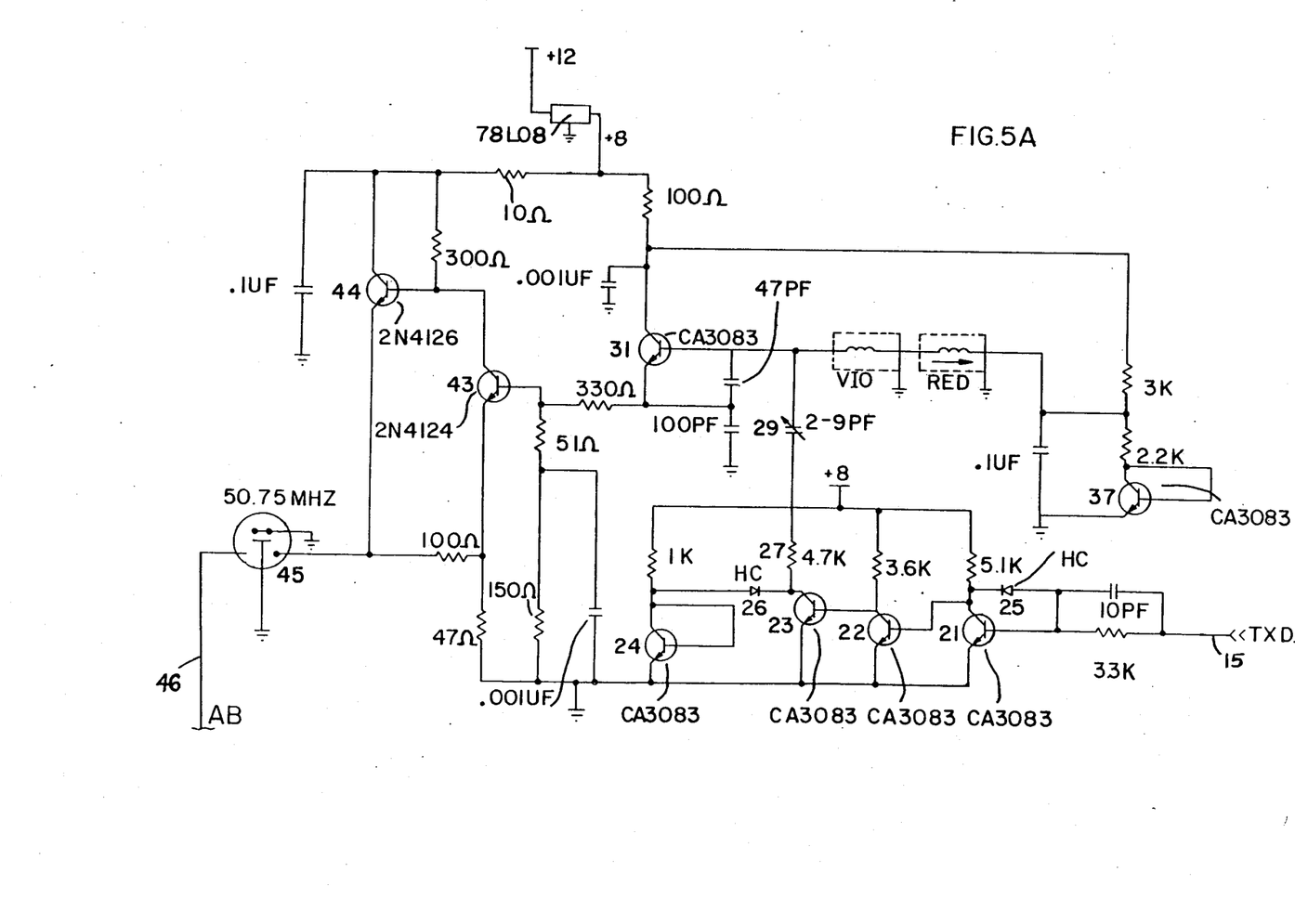
FIG. 5A–5C is a circuit diagram providing component values for the preferred embodiment of the present invention, as well as a preferred embodiment of a receiver input filter.

It is necessary to provide an output filter to separate the transmitted frequency centered at 50.75 MHz from the received frequency and centered at 219 MHz, and to prevent harmonics from the transmitter from interfering with reception over a wide group of frequencies. A filter which provides such function is illustrated in FIG. 4. Values of the individual components in the preferred embodiment are shown in FIG. 5.

The resulting filter provides a cutoff frequency at 65 MHz with minimal passband ripple. In the preferred embodiment, the value of capacitor 76 is chosen to be parallel resonant with inductor 75 and other parasitic reactances at the receiver input frequency (219 MHz)

while simultaneously trapping out the fourth harmonic of the transmitter.

Figure 5B:
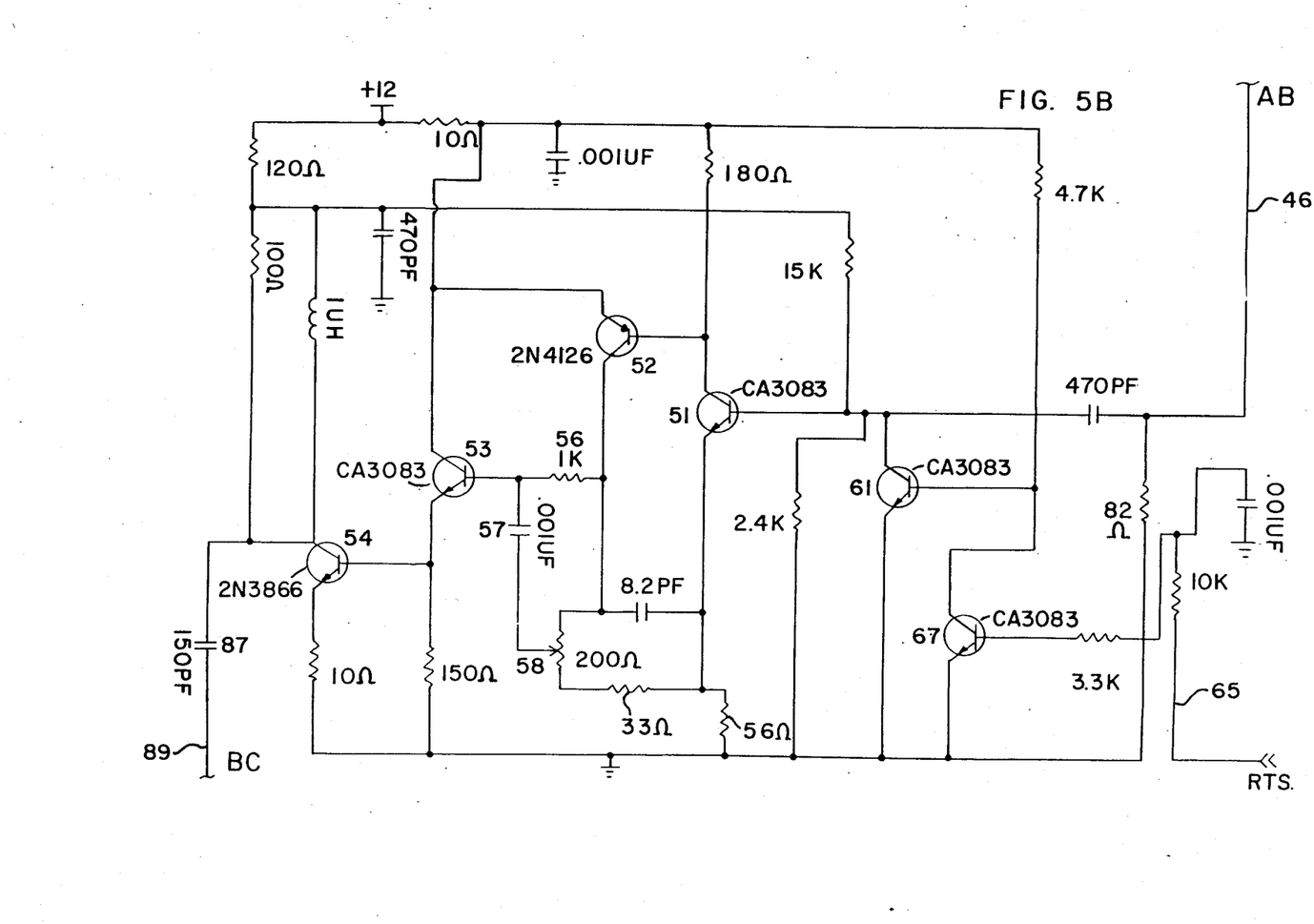
Figure 5C:
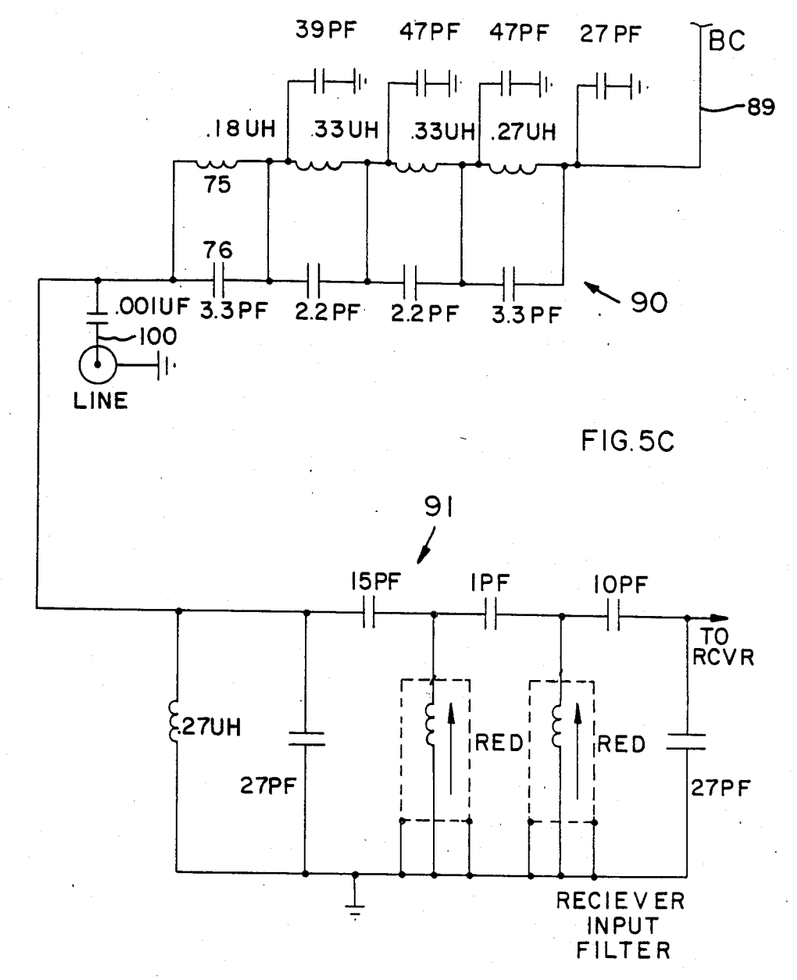

Finally, FIG. 5A-5C includes values and component designations for the presently preferred embodiment. Also shown is a receiver input filter 91 which may preferably be used in conjunction with transmitter output filter 90. These filters provide good respective filtering for the transmitter and receiver sections of the modem, while providing excellent impedance matching to the 75 ohm LAN cable network without need for a diplex transformer coupler.

The foregoing descriptions of preferred embodiments of the present invention illustrate the numerous advantages provided. For example, the digital/analog converter minimizes distortion in the frequency modulated analog signal by incorporating time compensation means to balance the duty cycle of the generated signal and by utilizing a highly stable oscillator with temperature compensating bias. The novel switching circuit for the switched capacitor oscillator provides numerous benefits that avoid introduction of undesired noise or amplitude modulation of the FSK signal.

Similarly, the switched transmission amplifier minimizes switching transient effects while simultaneously providing a simplified circuit for reducing production costs and increasing reliability. In particular, difficulties of providing of necessary gain adjustment without introducing additional sources of potential output distortion or noise are overcome. Further, the inventive design greatly reduces spurious signal emission when the transmission circuit is off.

It should be understood that, although preferred embodiments of the rf modem transmitter circuit have been described, the invention is not limited to such particular embodiments but may alternatively be embodied in other specific forms without departing from its spirit or essential characteristics. The present embodiments are, therefore, to be considered in all respects as illustrative and not restrictive, and the scope of the invention is indicated by the claims rather than by the foregoing description. All changes which come within the meaning and range of the equivalents of the claims are, therefore, intended to be embraced therein.

I claim:

1. An rf modem transmitter including a digital to analog converter for converting an input data signal having a first and a second state to a modulated analog signal, and a transmitter amplifier for amplifying the analog signal and controlling a transmitted carrier, wherein:

said digital to analog converter comprises a master oscillator having a frequency determining means;

switchable means for altering the frequency of said master oscillator;

means for selectively switching said frequency altering means, said switching means switchable between a first and a second state and coupled to said frequency determining means such that said master oscillator operates at a first frequency when said switching means is in said first state, and a second differing frequency when said switching means is in said second state, said switching means comprising an electronic switch means operatively coupled to said frequency altering means, said electronic switch means having a control input;

said switching means further comprising means for balancing the first-to-second state and second-to-first state switching times of said switching means such that said first-to-second state switching time of said switching means is equal to said second-to-first state switching time of said switching means, said balancing means comprising means for delaying control signals, said delaying means having an input, and an output operatively coupled to said control input of said electronic switch means, said delay means providing delayed control signals at its output for controlling said electronic switch means responsive to switching control signals applied to the delay means input, whereby said switching control signals corresponding to desired transitions of said electronic switch means from said first-to-second states are delayed an amount substantially equal to the second-to-first state switching time of said electronic switching means.

2. The rf modem transmitter of claim 1 wherein said delay means also delays switching control signals corresponding to desired transitions of said electronic switch means from said second-to first states an amount substantially equal to the first-to-second state switching time of said electronic switching means.

3. The rf modem transmitter of claim 2 wherein said electronic switch means is a first electronic switch means, and said delay means comprises a second electronic switch means, wherein said first electronic switch means performs said first-to-second transition when said second electronic switch means performs a second-to-first transition in response to said switching control signal, and wherein said first electronic switch means performs said second-to-first transition when said second electronic switch means performs a first-to-second transition in response to said switching control signal.

4. The rf modem transmitter of claim 1 wherein said electronic switching means comprises a bipolar transistor, the emitter to collector path of said transistor being operatively connected to said capacitor and to ground such that said transistor provides a low impedance path operatively coupling said capacitor to ground when said transistor is active; and wherein said switching means further comprises fast recovery bias means for said transistor, said bias means comprising a first diode, a resistor, and a second diode, said resistor coupled at one end to supply voltage and at the other end to the anodes of both said first and said second diodes, the cathode of said first diode coupled to the output terminal of said transistor, and the cathode of said second diode coupled to ground.

5. The rf modem transmitter of claim 4 wherein said first diode is a hot carrier diode, and said second diode is a temperature compensating diode connected transistor.

6. An rf modem transmitter including a digital to analog converter for converting an input data signal having a first and a second state to a modulated analog signal, and a transmitter amplifier for amplifying the analog signal and controlling a transmitted carrier, wherein:

said digital to analog converter comprises a master oscillator having a frequency determining means;

switchable means for altering the frequency of said master oscillator;

means for selectively switching said frequency altering means, said switching means switchable between a first and a second state and coupled to said frequency determining means such that said master oscillator operates at a first frequency when said switching means is in said first state, and a second differing frequency when said switching means is in said second state;

said switching means including means for balancing the first-to-second state and second-to-first state switching times of said switching means such that said first-to-second state switching time of said switching means is equal to said second-to-first state switching time of said switching means; and wherein said digital to analog converter further comprises means for compensating the quality factor of said frequency determining means of the master oscillator, such that said quality factor is equal when said switching means is in said first and second states.

7. The rf modem transmitter of claim 6 wherein said quality factor compensating means is in series connection between said frequency altering switchable means and said switching means.

8. An rf modem transmitter including a digital to analog converter for converting an input data signal having a first and a second state to a modulated analog signal, and a transmitter amplifier for amplifying the analog signal and controlling a transmitted carrier, wherein:

said digital to analog converter comprises a master oscillator having a frequency determining means;
switchable means for altering the frequency of said master oscillator;
means for selectively switching said frequency altering means, said switching means switchable between a first and a second state and coupled to said frequency determining means such that said master oscillator operates at a first frequency when said switching means is in said first state, and a second differing frequency when said switching means is in said second state;
said switching means including means for balancing the first-to-second state and second-to-first state switching times of said switching means such that said first-to-second state switching time of said switching means is equal to said second-to-first state switching time of said switching means; and
a linear amplifier,
said linear amplifier comprising at least a first and a second stage, each having an input and an output, and
means for adjusting AC gain independently of DC gain and bias levels,
said gain adjusting means comprising first means for coupling the output of said first stage to the input of said second stage and providing fixed DC coupling between said first and second stages and DC bias for said second stage, and
second means for coupling the output of said first stage to the input of said second stage and having a substantially constant high DC impedance and an adjustable AC impedance, such that the AC impedance of the parallel combination of said first and second coupling means may be adjusted without change in the DC impedance of said parallel combination.

9. The rf modem transmitter of claim 8 wherein said first coupling means comprises a coupling resistor, and said second coupling means comprises a variable resistor in series with a capacitor, wherein the DC impedance of said series circuit is greater than the DC impedance of said coupling resistor, and the AC impedance of said series circuit is less than the AC impedance of said coupling resistor.

10. The rf modem transmitter of claim 8 wherein said transmitter further comprises means for selectively turning said linear amplifier on and off in response to a transmit control signal, said on and off selection means further shunting said modulated analog signal to ground.

11. A digital to analog converter for converting an input data signal to a modulated analog signal comprising:

a master oscillator having a frequency determining means;
switchable means for altering the frequency of said master oscillator;
means for selectively switching said frequency altering means, said switching means switchable between a first and second state and coupled to said frequency determining means such that said master oscillator operates at a first frequency when said switching means is in said first state, and a second differing frequency when said switching means is in said second state;
said switching means including means for balancing the first-to-second state and second-to-first state switching times of said switching means such that said first-to-second state switching time of said switching means is equal to said second-to-first state switching time of said switching means,
said switching means further comprising an electronic switch means operatively coupled to said frequency altering means, said electronic switch means having a control input; and
said balancing means comprises means for delaying control signals, said delaying means having an input, and an output operatively coupled to said control input of said electronic switch means,
said delaying means providing delayed control signals at its output for controlling said electronic switch means responsive to switching control signals applied to the delay means input, whereby said switching control signals corresponding to desired transitions of said electronic switch means from said first-to-second states are delayed an amount substantially equal to the second-to-first state switching time of said electronic switching means.

12. The digital to analog converter of claim 11 wherein said delay means also delays switching control signals corresponding to desired transitions of said electronic switch means from said second-to-first states an amount substantially equal to the first-to-second state switching time of said electronic switching means.

13. A transmitter amplifier for amplifying an analog signal and controlling a transmitted carrier comprising:

a linear amplifier, said linear amplifier comprising at least a first and a second stage, each having an input and an output, and
means for adjusting AC gain independently of DC gain and bias levels, said gain adjusting means comprising first means for coupling the output of said first stage to the input of said second stage and providing fixed DC coupling between said first and second stages and DC bias for said second stage, and second means for coupling the output of said first stage to the input of said second stage and having a substantially constant high D.C. impedance and an adjustable AC impedance, such that the AC impedance of the parallel combination of said first and second coupling means may be adjusted without change in the DC impedance of said parallel combination.

14. The transmitter amplifier of claim 13 further comprising means for selectively turning said linear amplifier on and off in response to a transmit control signal, said on and off selection means further shunting said modulated analog signal to ground.

* * * * *